US011590560B2

(12) United States Patent
Shiiba et al.

(10) Patent No.: US 11,590,560 B2
(45) Date of Patent: Feb. 28, 2023

(54) STRUCTURE FOR PRODUCING CAST

(71) Applicant: Kao Corporation, Tokyo (JP)

(72) Inventors: Ryota Shiiba, Utsunomiya (JP);
Yoshiyuki Kibe, Utsunomiya (JP);
Toshihiko Mori, Utsunomiya (JP);
Yuki Kondo, Utsunomiya (JP)

(73) Assignee: KAO CORPORATION, Tokyo (JP)

( * ) Notice: Subject to any disclaimer, the term of this patent is extended or adjusted under 35 U.S.C. 154(b) by 335 days.

(21) Appl. No.: 16/764,030

(22) PCT Filed: Oct. 26, 2018

(86) PCT No.: PCT/JP2018/040002
§ 371 (c)(1),
(2) Date: May 14, 2020

(87) PCT Pub. No.: WO2019/097987
PCT Pub. Date: May 23, 2019

(65) Prior Publication Data
US 2020/0346279 A1  Nov. 5, 2020

(30) Foreign Application Priority Data

Nov. 20, 2017 (JP) .............................. JP2017-222438

(51) Int. Cl.
| | |
|---|---|
| B22C 1/18 | (2006.01) |
| B29C 33/38 | (2006.01) |
| C08K 3/04 | (2006.01) |
| C08K 3/22 | (2006.01) |
| C08K 3/34 | (2006.01) |
| C08K 7/06 | (2006.01) |
| B22C 1/16 | (2006.01) |

(52) U.S. Cl.
CPC .............. *B22C 1/181* (2013.01); *B22C 1/167* (2013.01); *B29C 33/3842* (2013.01); *C08K 3/04* (2013.01); *C08K 3/22* (2013.01); *C08K 3/34* (2013.01); *C08K 3/346* (2013.01); *C08K 7/06* (2013.01); *C08K 2003/2227* (2013.01); *C08K 2201/004* (2013.01); *C08K 2201/005* (2013.01); *C08K 2201/014* (2013.01)

(58) Field of Classification Search
CPC ........ C08K 2201/004; C08K 2201/005; B22C 1/181
See application file for complete search history.

(56) References Cited

U.S. PATENT DOCUMENTS

| | | | |
|---|---|---|---|
| 4,137,085 A | 1/1979 | Matsui | |
| 4,203,771 A | 5/1980 | Matsui | |
| 4,834,925 A | 5/1989 | LaRoche, Jr. | |
| 7,651,592 B2 | 1/2010 | Osaki | |
| 2005/0239630 A1* | 10/2005 | Oba | .................. C04B 35/66 |
| | | | 501/120 |
| 2010/0307714 A1* | 12/2010 | Yoshida | .................... B22C 9/00 |
| | | | 164/369 |
| 2013/0105103 A1 | 5/2013 | Ikenaga | |
| 2013/0174999 A1* | 7/2013 | Shaw | ........................ B22C 1/00 |
| | | | 501/129 |
| 2015/0361619 A1* | 12/2015 | Ikenaga | ................. D21H 17/74 |
| | | | 162/147 |

FOREIGN PATENT DOCUMENTS

| | | |
|---|---|---|
| CN | 88100144 A | 10/1988 |
| CN | 107252874 A | 10/2017 |
| EP | 2 233 226 A1 | 9/2010 |
| JP | 52-123319 A | 10/1977 |
| JP | 54-107829 A | 8/1979 |
| JP | 1-262040 A | 10/1989 |
| JP | 2-59137 A | 2/1990 |
| JP | 2004-181472 A | 7/2004 |
| JP | 2009-195982 A | 9/2009 |
| JP | 2010-142840 A | 7/2010 |
| JP | 2011-056563 A | 3/2011 |
| JP | 2011-121105 A | 6/2011 |
| JP | 2016-2572 A | 1/2016 |
| KR | 10-2013-0111229 A | 10/2013 |

OTHER PUBLICATIONS

"Foreign Modern Counting-Styling Materials", Shanghai Mechanical Engineering Society, Organization for Counting, p. 116, Shanghai Scientific Technical Literature Press, Nov. 1980; with computer-generated English translation, total 3 pages.
"Furan Resins from Hard Sand Practical Technology", Sharminer, Machine Industry Press, pp. 87-91, Oct. 1995; with computer-generated English translation, total 13 pages.
"The Practical Mounting Technical Question Answering", edited by the Japan Counting Industry Society, Down, p. 46, Agricultural Machines Press, China, Aug. 1983; with computer-generated English translation, total 3 pages.
"1. Introduction", (Suzuki, "Characteristics of montmorillonite and green sand molds", Abstracts of the 60th annual meeting of the Clay Science Society of Japan), 2016, pp. 104-105, Total 12 pages.
"2-1. Crystal structure", "3-2. Caking additives of casting", (Onikata, "Characteristics and Application of Bentonite", Journal of the Clay Science Society of Japan), 2007, vol. 46, No. 2, pp. 131-138.
International Search Report (PCT/ISA/210) issued in PCT/JP2016/040002, dated Jan. 29, 2019.
Extended European Search Report dated Aug. 3, 2021 in European Application No. 18877939.1.

* cited by examiner

Primary Examiner — Alexander C Kollias
(74) Attorney, Agent, or Firm — Xsensus LLP

(57) ABSTRACT

A structure for manufacturing castings, containing an inorganic fiber, a layered clay mineral, and an inorganic particle other than the layered clay mineral and having an organic content of 5 mass % or lower or having a mass loss of 5 mass % or lower when heated at 1000° C. for 30 minutes. The inorganic particle preferably contains one or more selected from obsidian, graphite, and mullite. The inorganic fiber preferably contains carbon fiber. The inorganic fiber preferably has an average length of 0.5 to 15 mm. The layered clay mineral preferably contains one or more selected from bentonite and montmorillonite.

19 Claims, 1 Drawing Sheet

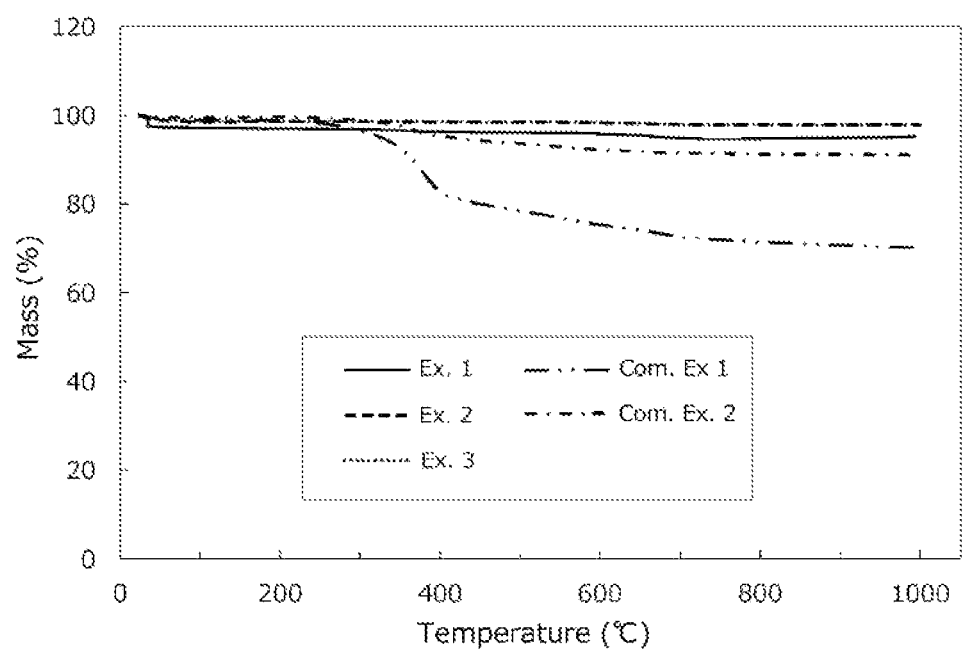

STRUCTURE FOR PRODUCING CAST

TECHNICAL FIELD

The present invention relates to a structure for manufacturing castings.

BACKGROUND ART

In general production of castings, a casting mold forming a cavity is created out of casting sand from a wooden or metallic pattern and, after, if necessary, inserting a core in the cavity, molten metal is poured into the cavity. It is difficult to use casting molds except for mass-production of castings because, for one thing, pattern making requires skill and, for another, the mold is difficult to form, heavy, and accompanied by the problem of waste. Additionally, a sand mold is formed by hardening casting sand that is a mixture of common sand and a binder so as to secure shape retention, a sand reclamation process is needed in reusing the spent sand. Sand reclamation is accompanied by generation of waste such as dust.

To solve these problems, proposals have been made, relating to a molded article comprising organic fiber, such as pulp, and inorganic fiber (see patent literature 1 below) or a molded article comprising inorganic particles as a main component, a thermosetting resin as a binder, and inorganic fiber (see patent literatures 2 and 3 below).

CITATION LIST

Patent Literature

Patent literature 1: JP 2004-181472A
Patent literature 2: U.S. Pat. No. 7,651,592
Patent literature 3: U.S. Pat. No. 8,387,683

SUMMARY OF INVENTION

The present invention relates to a structure for manufacturing castings which contains an inorganic fiber, a layered clay mineral, and inorganic particles other than the layered clay mineral and having an organic content of not more than 5 mass %.

The present invention also relates to a structure for manufacturing castings which contains an inorganic fiber, a layered clay mineral, and inorganic particles other than the layered clay mineral and having a mass loss of 5 mass % or less on heating at 1000° C. for 30 minutes.

BRIEF DESCRIPTION OF DRAWINGS

FIG. 1 is a graph showing the mass loss of the structure for manufacturing castings made in Examples and Comparative Examples.

DESCRIPTION OF EMBODIMENTS

According to the techniques of patent literatures 1 to 3, the problems of moldability, weight reduction, and disposal of spent molds are solved to some extent. However, the molded articles described still have room for improvements on gas defects in castings due to combustion gas from the organic matter of the molded article and surface smoothness of the castings.

The present invention relates to a structure for manufacturing castings that eliminates the disadvantages of the conventional techniques.

The present invention will be described on the basis of its preferred embodiments. The structure for manufacturing castings (hereinafter also referred simply to as "the structure") of the present invention contains an inorganic particle, an inorganic fiber, and a layered clay mineral. As used herein, the term "structure for manufacturing castings" or simply "structure" refers to a part constituting a piece of a mold, such as a piece of a split mold, or a mold per se, depending on the context. Unless otherwise noted, all the mass percentages (mass %) as used throughout the specification are based on the total mass of the structure for manufacturing castings.

The structure of the present invention contains inorganic particles. The inorganic particle is used to improve the heat resistance of the structure. The inorganic particle contained in the structure of the present invention is an inorganic particle other than the layered clay mineral hereinafter described unless otherwise specified.

The inorganic particles for use in the present invention may be particulate obsidian, graphite, mullite, silica, magnesia, zirconia, alumina, or talc. Preferred of them are graphite, mullite, and obsidian in terms of resistance to burn-on. More preferred are graphite and mullite in terms of heat resistance. Graphite is generally classified into naturally occurring graphite, such as scaly graphite and earthy graphite, and artificial graphite produced petroleum coke, carbon black, pitch, or a like base material. Preferred of them is scaly graphite in terms of improvement on formability into a structure. Two or more types of inorganic particles may be used in combination.

The inorganic particles for use in the present invention preferably have an average particle size of 1 μm or greater, more preferably 10 μm or greater, in order to improve the air permeability of the structure thereby to minimize gas-induced defects of castings. The average particle size of the inorganic particles is preferably 3000 μm or smaller, more preferably 500 μm or smaller, in order for the structure to retain sufficient high-temperature strength during casting. More specifically, the average particle size of the inorganic particles is preferably 1 to 3000 μm, more preferably 10 to 500 μm. The inorganic particles may be subjected to pulverization using a known pulverizer so that their average particle size may fall in the above range.

The method of pulverization is not particularly limited. Pulverization may be performed in either a dry method or a wet method. Examples of equipment for dry pulverization include container-driven media mills, such as roller mills, tumbling ball mills, vibration ball mills, vibration rod mills, vibration tube mills, planetary ball mills, and centrifugal fluidizing mills; stirred media mills, such as tower mills, stirrer mills, continuous flow mills, and annular mills; compaction shear mills, such as high-speed centrifugal roller mills and Angmill; mortars, stone mills, masscolloiders, fret mills, edge runner mills, knife mills, pin mills, cutter mills, and hammer mills. Equipment for wet pulverization includes media grinders and medialess grinders. In a media grinder, inorganic particles to be pulverized, a liquid medium, such as water, and grinding media, such as balls and beads, are added to a chamber, and a rotative power is applied to the media via a stirrer, such as a screw, to accomplish pulverization. Examples of the medialess grinders include high-pressure homogenizers and ultrahigh-pressure homogenizers.

The average particle size of the inorganic particles is obtained through particle size distribution determination using, e.g., a laser diffraction particle size analyzer (e.g., LA-950V2 from Horiba. Ltd., equipped with a dry feeder accessory). In the measurement of particle size distribution, a sample of inorganic particles is put in the dry feeder unit and dispersed in powder form by compressed air. The measurement is taken under an air pressure of 0.20 MPa and a flow rate of 320 L/min. The amount of the sample to be added is controlled so that the laser light absorption of the sample may range from 95% to 99%. An average of particle diameters is calculated from the resulting volume-based particle size distribution, which is defined to be the average particle size.

With a view to improving shape retention, surface smoothness, and parting properties in making the structure and during casting, the content of the inorganic particles in the structure is preferably 40 mass % or higher, more preferably 60 mass % or higher, and preferably 90 mass % or lower, more preferably 85 mass % or lower. Specifically, with the same view, the content of the inorganic particles is preferably in the range of 40 to 90 mass %, more preferably 60 to 85 mass %.

The structure of the present invention contains an inorganic fiber. The inorganic fiber is used primarily for the retention of a desired shape of the structure, particularly in order for the structure to retain its shape during casting, resisting against combustion due to the heat of molten metal. Examples of the inorganic fiber for use in the present invention include artificial mineral fibers, such as carbon fibers and rock wool, ceramic fibers, and natural mineral fibers. Preferred of them are carbon fibers with the view of maintaining the shape and strength of the structure in high temperatures during casting. Pitch-based and polyacrylonitrile (PAN)-based carbon fibers are preferred. PAN-based carbon fibers are more preferred. These inorganic fibers may be used either individually or in combination of two or more thereof.

The inorganic fiber preferably has an average length of 0.5 mm or longer, more preferably 1 mm or longer, and preferably 15 mm or shorter, more preferably 8 mm or shorter, even more preferably 5 mm or shorter, with a view to improving the formability into the structure and uniformity of the structure. More specifically, with the same view, the average length of the inorganic fiber is preferably 0.5 to 15 mm, more preferably 1 to 8 mm, even more preferably 1 to 5 mm. The average length of the inorganic fiber can be measured using, e.g., a fiber length measuring device HiRes Fiber Quality Analyzer from OpTest Equipment Inc.

When the structure contains carbon fibers as inorganic fiber, the carbon fiber content is preferably 1 mass % or higher, more preferably 2 mass % or higher, with a view to improving formability into the structure and shape retention of the structure during casting. The carbon fiber content is preferably 20 mass % or lower, more preferably 16 mass % or lower. Specifically, with the same view, the carbon fiber content is preferably 1 to 20 mass %, more preferably 2 to 16 mass %.

The content of the inorganic fiber is preferably 1 mass % or higher, more preferably 2 mass % or higher, with a view to improving formability into the structure and shape retention of the structure during casting. The inorganic fiber content is preferably 20 mass % or lower, more preferably 16 mass % or lower. Specifically, with the same view, the inorganic fiber content is preferably 1 to 20 mass %, more preferably 2 to 16 mass %.

According to the techniques described in patent literatures 1 through 3, the structures for manufacturing castings are made from a mixture of the above described inorganic particles or fibers and an organic material, such as pulp or a thermosetting resin. Use of pulp as an organic material provides advantages of improved formability into the structure and improved shape retention of the structure. That is, the structure is moldable by a papermaking process using a fluidized pulp slurry having water as a solvent, and, after papermaking the molded structure precursor is consolidated by drying. Use of a thermosetting resin as an organic material is advantageous in improving the shape retention of the structure because the resin functions as a binder binding inorganic particles and inorganic fibers. However, such an organic material is likely to generate gas upon combustion or fusion at the time of casting, and the gas constitutes a cause of gas-induced casting defects, such as holes and cracks. On the other hand, when the content of the organic material is reduced with the view of gas defects reduction, formability into the structure and shape retention of the structure markedly reduce, resulting in a failure to efficiently manufacture castings with desired dimensional accuracies.

The inventors have conducted intensive investigations with the aim of solving the above problem. They have found as a result that use of a layered clay mineral, which is an inorganic material, instead of the organic material such as pulp or resin makes it feasible to reduce the occurrence of gas defects and provide castings with high surface smoothness as well as secure formability and shape retention of the structure even when the structure is substantially free of an organic material.

The structure of the present invention contains a layered clay mineral. The layered clay mineral functions in the present invention chiefly to interpose between inorganic particles and inorganic fibers thereby to secure formability into the structure and impart low- and high-temperature strength to the structure.

The layered clay mineral that can be used in the present invention may be an inorganic crystalline compound having a layered structure typified by sheet silicate minerals. The layered clay mineral may be either natural or artificial. Examples of the layered clay mineral include clay minerals typified by kaolinite group, smectite group, and mica group minerals. The kaolinite group minerals are exemplified by kaolinite. Examples of the smectite group minerals include montmorillonite, bentonite, saponite, hectorite, beidellite, stevensite, and nontronite. Examples of the mica group minerals include vermiculite, halloysite, and tetrasilicic mica. Hydrotalcite or a like layered double hydroxide is useful as well. Of these layered clay minerals preferred are montmorillonite and bentonite for their high caking properties on other components with added water in view of formability to shape in making the structure. Kaolinite and montmorillonite are preferred in terms of heat resistance during casting. These layered clay minerals may be used either individually or in combination thereof.

The layered clay mineral preferably has an average particle size of 0.1 µm or greater, more preferably 1 µm or greater, and preferably 500 µm or smaller, more preferably 200 µm or smaller. Specifically, the average particle size of the layered clay mineral is preferably in the range of 0.1 to 500 µm, more preferably 1 to 200 µm. In the case where the layered clay mineral particles are platy, the term "average particle size" means the length of the longest side. The layered clay mineral with the average particle size falling in that range exhibits good dispersibility in the structure, thereby providing further enhanced formability into the structure and further improved structure strength. The average particle size of the layered clay mineral can be measured in the same manner as for the inorganic particles. The layered clay mineral may be further pulverized to have an average particle size in the above range using the same pulverization equipment as used for the inorganic particles.

With a view to securing good formability into the structure, the content of the layered clay mineral in the structure is preferably 1 mass % or higher, more preferably 3 mass % or higher, even more preferably 5 mass % or higher. With a view to reducing gas generation from the structure during casting thereby to reduce the occurrence of gas defects in castings, the layered clay mineral content is preferably 50 mass % or lower, more preferably 30 mass % or lower, even more preferably 20 mass % or lower. Specifically, the layered clay mineral content is preferably in the range of from 1 to 50 mass %, more preferably 3 to 30 mass %, even more preferably 5 to 20 mass %.

In the case of using montmorillonite as a layered clay mineral, the montmorillonite content is preferably 1 mass % or higher, more preferably 3 mass % or higher, even more preferably 5 mass % or higher, in terms of formability into the structure. With the view of reducing gas generation from the structure during casting thereby to reduce the occurrence of gas defects in castings, the montmorillonite content is preferably 50 mass % or lower, more preferably 30 mass % or lower, even more preferably 20 mass % or lower. Specifically, the montmorillonite content is preferably 1 to 50 mass %, more preferably 3 to 30 mass %, even more preferably 5 to 20 mass %.

Containing the layered clay mineral, the structure of the present invention has a reduced mass loss under high temperature conditions, such as in casting. The mass loss of a structure being equated substantially with the occurrence of gas generation from the structure during casting, a smaller mass loss means more stable formability into the structure and more stable shape retention and high-temperature strength of the structure. This contributes to the maintenance of the dimensional accuracy of manufactured castings and the reduction of gas defects in the castings.

More specifically, it is preferred for the structure of the present invention to have a mass loss of not more than 5 mass %, more preferably 3 mass % or less, upon heating at 1000° C. for 30 minutes in a nitrogen atmosphere. The lower a mass loss is, the better it is. However, about 5 mass % would be a practical lower limit of the mass loss for sufficient achievement of the effects of the present invention. The determination of mass loss will be described in detail in Examples given later.

The structure of the invention may contain, in addition to the aforementioned components, a material containing an organic component (hereinafter also referred to as an organic material) unless the effects of the present invention are impaired. Materials containing an organic component (organic materials) are exemplified by binders and shape retaining agents, including pulp, starch, thermosetting resins, coloring agents, and thermoexpandable particles. In using any material containing an organic component, the content of the organic component, i.e., the organic content, relative to the entire structure for manufacturing castings, is preferably not more than 5 mass %, more preferably not more than 1 mass %, even more preferably substantially zero mass %, in terms of effective reduction of occurrence of gas defects in castings. Unavoidable incorporation of organic components into the structure is acceptable, the organic components being originated in the inorganic particles, inorganic fibers, and layered clay minerals or being present in the water used in making a structure (hereinafter described) are incorporated into a structure unavoidably. The term "organic component" as used herein denotes a naturally-occurring or chemically-synthesized substance having a hydrocarbon in its structure.

The structure of the present invention may be coated with a coating for the purpose of preventing burn-on and improving surface smoothness and parting properties unless the effects of the present invention are impaired. Useful coatings are exemplified by those widely used in sand mold casting and shell mold casting, such as a coating containing refractory particles as a main material and a thermosetting resin or a silicone as an organic component.

While the structure of the present invention has been illustrated, a method for making a structure of the present invention will then be described. The method of the present invention is roughly divided into a step of preparing a structure precursor by mixing inorganic fibers, a layered clay mineral, inorganic particles other than the layered clay mineral, and a dispersing medium and a step of heat-pressing the structure precursor to form the structure while drying to consolidate in a press mold.

The method starts with the preparation of a structure precursor by mixing inorganic fibers, a layered clay mineral, inorganic particles other than the layered clay mineral, and a dispersing medium (mixing process). More specifically, inorganic particles, inorganic fibers, and a layered clay mineral are mixed uniformly and then kneaded with an added dispersing medium, such as water to prepare a structure precursor. The preparation of the structure precursor may be carried out either manually or by using any known kneading machine. It is preferred to use an apparatus suited to knead a highly viscous material like paste and dough, such as a universal stirrer, a kneader, or a pressure kneader. For example, the kneading is performed using a bench kneader (available from Irie Shokai) at 20 rpm for 10 minutes. The amount of the dispersing medium, such as water, to be added is preferably 40 to 60 parts by mass per 100 parts by mass of the mixture composed of the inorganic particles, inorganic fibers, and layered clay mineral.

The layered clay mineral in a dry state is in granular or powder form but, upon contact with water, the cations present between the unit crystal lamellae are hydrated with penetrating water molecules. As a result, the layered clay mineral in a wet state has the interlamellar distance increased by the water molecules, namely is swollen with water and becomes a viscous fluid. Since the fluidized layered clay mineral combines fluidity and viscosity, it is ready to enter between the inorganic particles and the inorganic fibers and function like a binder binding them together. The structure precursor contains the inorganic particles, inorganic fibers, layered clay mineral, and water and is in dough form easily deformable by external force application.

With a view to increasing the formability to shape, the structure precursor in dough form may be rolled out into sheet form (rolling process) through any external force application means configured to roll the structure precursor into sheet form. For example, the structure precursor is passed between a pair of rollers or between a roller and a flat surface. In this process, the structure precursor remains in a state easily deformable by application of external force.

Subsequently, the structure precursor in dough or sheet form is heat pressed in a press mold into a structure having a desired shape as a casting mold while being dried and consolidated (heat pressing process). The press mold is shaped to the contour of a desired structure for manufacturing castings. On heat-pressing the structure precursor against the press mold, the shape of the press mold is transferred to the structure precursor, and the water content of the structure precursor is removed to dry and consolidate the structure precursor into a structure with a desired shape of a casting mold. The thus obtained structure is no more easily deformable by external force. The structure may be one-half of a two-part split mold having a cavity open to the outside or an integral one-piece mold.

As a result of water removal from the structure precursor by the heating and pressing, the layered clay mineral in the structure precursor loses the interlamellar water molecules. Due to the loss of water molecules, the layered clay mineral shrinks and consolidate, forming a dense structure together with the inorganic particles and inorganic fibers inside the structure. As a result, a shear force is generated between the inorganic particles, inorganic fibers, and layered clay mineral, making the structure not easily deformable by external force and strong enough to retain its shape effectively.

The temperature of the heat applied in the heat pressing process is preferably at least 70° C., more preferably 100° C. or higher, to facilitate water removal from the structure precursor. The heating temperature in the heat pressing process is preferably 250° C. or lower, more preferably 200° C. or lower. Specifically, the heating temperature is preferably 70° C. to 250° C. more preferably 100° C. to 200° C. The heating time is preferably at least 1 minute and preferably 60 minutes or shorter, in terms of production efficiency. Specifically, the heating time is preferably 1 to 60 minutes. The pressure applied in the heat pressing process is preferably at least 0.5 MPa, more preferably 1 MPa or higher, and preferably 20 MPa or lower, more preferably 10 MPa or lower, in terms of improvement on structure formability. Specifically, the pressure is preferably 0.5 to 20 MPa, more preferably 1 to 10 MPa.

In order to reduce water vapor-induced gas defects in castings, the structure of the present invention preferably has its moisture content adjusted to 5 mass % at the highest, more preferably 3 mass % or lower. The moisture content of the structure may be adjusted in the heat pressing process or in both the heat pressing process and an extra drying process. When a drying process is added, a known thermostat or hot air dryer can be used. The drying process may be carried out under the same temperature and time conditions as in the heat pressing process.

In a case where the structure is one-half of a two-part split casting mold, two halve of the split mold are made by the above described method and joined together with the cavity inside to assemble the mold. Joining the mold halves is achieved by means of joining members, such as screws and clamps, or general-purpose adhesive or using a sand mold covering the split mold.

While the thickness of the structure may be decided as appropriate to the shape of a desired casting product, the structure preferably has a thickness of 0.2 to 10 mm, more preferably 1 to 5 mm, in at least the portion that is to be brought into contact with molten metal. With the thickness being in that range, the structure exhibits sufficient high-temperature strength and maintains shape retention during casting.

Made of inorganic components that are relatively light and heat-resistant, the structure of the present invention thus made through the above processing steps is light and highly resistant to heat. In particular, containing the inorganic particles, inorganic fibers, and layered clay mineral, the structure of the present invention combines high strength in both low and high temperatures and high shape retention.

Production of a casting using the structure of the present invention can be achieved by a common casting technique. That is, molten metal is poured through a sprue formed in the structure to carry out casting. After casting, the mold is cooled to a predetermined temperature, and the structure is removed to expose a casting product, which, if necessary, may be subjected to a post treatment, such as trimming.

Compared with when in using a sand mold or a structure containing an organic material, a casting mold composed of the structure of the present invention effectively reduces casting defects, such as burn-on of the structure component on casting surfaces and gas defects, and therefore enables manufacturing castings excellent in dimensional accuracy and surface smoothness. Capability of manufacturing castings with excellent dimensional accuracy and surface smoothness promises reduction of the need for post-treatment on the shape and dimensional accuracy and eventually leads to reduction in manufacturing cost of castings.

While the present invention has been described on the basis of its preferred embodiments, it should be understood that the present invention is not limited thereto.

The following clauses are considered further descriptive of the disclosed invention.

[1] A structure for manufacturing castings, containing an inorganic fiber, a layered clay mineral, and an inorganic particle other than the layered clay mineral and having an organic content of 5 mass % or lower.

[2] A structure for manufacturing castings, containing an inorganic fiber, a layered clay mineral, and an inorganic particle other than the layered clay mineral and having a mass loss of 5 mass % or lower when heated at 1000° C. for 30 minutes.

[3] The structure as set forth in clause [1] or [2], wherein the inorganic particle contains one or more selected from obsidian, graphite, and mullite.

[4] The structure as set forth in any one of clauses [1] to [3], wherein the inorganic fiber contains carbon fiber.

[5] The structure as set forth in any one of clauses [1] to [4], wherein the inorganic fiber has an average length of 0.5 to 15 mm.

[6] The structure as set forth in any one of clauses [1] to [5], wherein the layered clay mineral contains one or more selected from bentonite and montmorillonite.

[7] The structure as set forth in any one of clauses [1] to [6], preferably having a mass loss of 5 mass % or lower, more preferably 3 mass % or lower, when heated at 1000° C. for 30 minutes in a nitrogen atmosphere.

[8] The structure as set forth in any one of clauses [1] to [7], wherein the inorganic particle is preferably present in an amount of 40 mass % or more, more preferably 60 mass % or more, and 90 mass % or less, more preferably 85 mass % or less, specifically the inorganic particle is preferably present in an amount of 40 to 90 mass %, more preferably 60 to 85 mass %.

[9] The structure as set forth in any one of clauses [1] to [8], wherein the inorganic particle preferably has an average particle size of 1 μm or greater, more preferably 10 μm or greater, and 3000 μm or smaller, more preferably 500 μm or smaller, 1 to 3000 μm, more preferably 10 to 500 μm.

[10] The structure as set forth in any one of clauses [1] to [9], wherein the inorganic fiber preferably has an average length of 0.5 mm or longer, more preferably 1 mm or longer, and 15 mm or shorter, more preferably 8 mm or shorter, even more preferably 5 mm or shorter, specifically 0.5 to 15 mm, more preferably 1 to 8 mm, even more preferably 1 to 5 mm.

[11] The structure as set forth in any one of clauses [1] to [10], wherein the inorganic fiber is preferably present in an amount of 1 mass % or more, more preferably 2 mass % or more, and 20 mass' or less, more preferably 16 mass % or less, specifically 1 to 20 mass %, more preferably 2 to 16 mass %.

[12] The structure as set forth in any one of clauses [1] to [11], wherein the inorganic fiber contains carbon fiber, the carbon fiber being preferably present in an amount of 1 mass % or more, more preferably 2 mass % or more, and 20 mass % or less, more preferably 16 mass % or less, specifically 1 to 20 mass %, more preferably 2 to 16 mass %.

[13] The structure as set forth in any one of clauses [1] to [12], wherein the layered clay mineral is preferably present in an amount of 1 mass % or more, more preferably 3 mass % or more, even more preferably 5 mass' or more, and 50 mass % or less, more preferably 30 mass % or less, even more preferably 20 mass % or less, specifically 1 to 50 mass %, more preferably 3 to 30 mass %, even more preferably 5 to 20 mass %.

[14] The structure as set forth in any one of clauses [1] to [13], wherein the layered clay mineral contains montmorillonite, the montmorillonite being preferably present in an amount of 1 mass % or more, more preferably 3 mass % or more, even more preferably 5 mass % or more, and 50 mass % or less, more preferably 30 mass % or less, even more preferably 20 mass % or less, specifically 1 to 50 mass %, more preferably 3 to 30 mass %, even more preferably 5 to 20 mass %.

[15] The structure as set forth in any one of clauses [1] to [14], wherein the layered clay mineral preferably has an average particle size of 0.1 μm or greater, more preferably 1 μm or greater, and 500 μm or smaller, more preferably 200 μm or smaller, specifically 0.1 to 500 μm, more preferably 1 to 200 μm.

[16] A method for making a structure for manufacturing castings, including a step of mixing an inorganic fiber, a layered clay mineral, an inorganic particle other than the layered clay mineral, and a dispersing medium and preparing a structure precursor and a step of heat-pressing the structure precursor to form the structure while drying to consolidate in a press mold.

[17] The method as set forth in clause [16], wherein the heating temperature in the heat-pressing is preferably 70° C. or higher, more preferably 100° C. or higher, and 250° C. or lower, more preferably 200° C. or lower, specifically 70° C. to 250° C. more preferably 100° C. to 200° C.

[18] The method as set forth in clause [16] or [17], wherein the heating time in the heat-pressing is preferably 1 minute or longer and preferably 60 minutes or shorter, specifically 1 to 60 minutes.

[19] The method as set forth in any one of clauses [16] to [18], wherein the pressure in the heat-pressing is preferably 0.5 MPa or higher, more preferably 1 MPa or higher, and 20 MPa or lower, more preferably 10 MPa or lower, specifically 0.5 to 20 MPa, more preferably 1 to 10 MPa.

[20] The method as set forth in any one of clauses [16] to [19], wherein the heat pressing is preferably carried out until the moisture content of the structure precursor reduces to 5 mass % or lower, more preferably 3 mass % or lower.

[21] A method for producing a casting including casting a molten metal using the structure as set forth in any one of clauses [1] to [15].

EXAMPLES

The present invention will now be illustrated in more detail by way of Examples, but it should be understood that the present invention is not construed as being limited thereto. Unless otherwise noted, all the percentages and parts are by mass.

Example 1

A structure for manufacturing castings was made in accordance with the method described above using a mixture of 62% of particulate obsidian with an average particle size of 27 μm (Nice Catch Flower #330, from Kinsei Matec Co., Ltd.) as inorganic particles, 8% of PAN-based carbon fibers with an average length of 3 mm (Pyrofil TR03CM A4M, from Mitsubishi Chemical Corp.) as inorganic fiber, and 30% of montmorillonite (Kunipia F, from Kunimine Industries Co., Ltd.) as layered clay mineral. Fifty parts of water was added per 100 parts of the mixture. The heat-pressing was performed under conditions of a heating temperature of 140° C., a heating time of 10 minutes, and a pressure of 5 MPa.

Example 2

A structure was made in the same manner as in Example 1, except for using 77% of scaly graphite with an average particle size of 48 μm (SRP-150, from Ito Graphite Co., Ltd.) as inorganic particles in place of particulate obsidian and changing the ratio of montmorillonite to 15%.

Example 3

A structure was made in the same manner as in Example 2, except for using 77% of mullite with an average particle size of 30 μm as inorganic particles in place of scaly graphite.

Examples 4 to 6

Structures were made in the same manner as in Example 3, except for mixing mullite, carbon fibers, and montmorillonite in the ratios shown in Table 1 below.

Examples 7 to 9

Structures were made in the same manner as in Example 3, except for mixing a phenol resin as an organic material and montmorillonite in the ratios shown in Table 1 below.

Comparative Example 1

A structure was made using organic fibers and a thermosetting resin as an organic material in place of a layered clay mineral. As the organic material, recycled newsprint pulp with an average fiber length of 1 mm and a CSF freeness of 150 cc as organic fiber and a phenol resin (Bellpearl® S-890, from Air Water Bellpearl Inc.) as a thermosetting resin were used in amounts of 26% and 18%, respectively. The amounts of the inorganic particles (obsidian) and the inorganic fibers (Torayca Chop, from Toray Industries, Inc.) were as shown in Table 1.

Preparation of Stock Slurry:

The raw materials shown in Table 1 and an appropriate amount of a polyacrylamide-based flocculant (A110, from Mitsui Cytec, Ltd.) were dispersed in water to prepare a stock slurry having a concentration of 3%.

Making of Structure by Papermaking Technique:

A papermaking mold used was a split mold having a cavity formed of a wire with a predetermined opening size and a large number of interconnecting holes that connect the inside cavity surface and the outside of the mold. A predetermined amount of the stock slurry, being circulated in a progressing cavity pump (Mono Pump), was injected under pressure into the cavity of the mold while being dewatered through the interconnecting holes, thereby to deposit a wet fiber mat on the surface of the wire. After the predetermined amount of the stock slurry was injected, pressurized air of 0.2 MPa was fed into the cavity for 30 seconds to dehydrate the fiber mat. The thus formed fiber mat was taken out of the papermaking mold and transferred to a drying mold heated to 220° C. The drying mold was a split mold forming a cavity and having a large number of interconnecting holes connecting the inside cavity surface and the outside. A sack-like elastic pressing member was inserted into the cavity through the upper opening of the drying mold, and a pressurized fluid (0.2 MPa compressed air) was fed into the pressing member to inflate the pressing member. The inflated pressing member pressed the fiber mat against the inner wall of the drying mold, whereby the fiber mat was dried while the contour of the inner wall of the drying mold was transferred to the fiber mat. After pressure drying for a predetermined period of time (90 seconds), the pressurized fluid was withdrawn from the elastic pressing member to let the pressing member shrink. The shrunken pressing member was retracted from the drying mold. The resulting molded article was taken out of the drying mold and cooled to give a structure for manufacturing castings of Comparative Example 1.

Comparative Example 2

A structure was made in the same manner as in Comparative Example 1, except for using organic fibers, a thermosetting resin, and thermoexpandable particles as organic materials in place of a layered clay mineral. As the organic materials, recycled newsprint pulp with an average fiber length of 1 mm and a CSF freeness of 150 cc as organic fiber, a phenol resin (Bellpearl S-890, from Air Water Bellpearl Inc.) as a thermosetting resin, and thermoexpandable microcapsules (Matsumoto Microsphere F-105D, from Matsumoto Yushi-Seiyaku Co., Ltd) as thermoexpandable particles were used in amounts of 4%, 12% and 4%, respectively. The amounts of the inorganic particles (scaly graphite) and the inorganic fibers (Pyrofil, from Mitsubishi Rayon Co., Ltd.) were as shown in Table 1.

Evaluation of Mass Loss:

Mass loss evaluation was made on the structures obtained in Examples and Comparative Examples using a thermogravimetric instrument (STA7200RV TG/DTA, from Seiko Instruments Inc.). Each structure was heated at 30° C. to 1000° C. at a rate of 20° C./min in a nitrogen atmosphere. The changes in mass as a function of temperature were recorded to calculate the mass loss percentage. The results obtained are shown in FIG. 1 and Table 1.

Surface Roughness of Casting:

A molten metal containing cast iron at 1350° C. was poured into a mold constructed of the structure obtained in Examples and Comparative Examples to make castings. The surface roughness (Ra: μm) of the castings was measured in accordance with JIS B0601:2013. A smaller Ra value indicates higher surface smoothness. The results are shown in Table 1.

TABLE 1

| | | | Example | | | | | | | | | Compara. Example | |
|---|---|---|---|---|---|---|---|---|---|---|---|---|---|
| | | | 1 | 2 | 3 | 4 | 5 | 6 | 7 | 8 | 9 | 1 | 2 |
| Component | Inorganic Particle | Obsidian | 62.0 | 0 | 0 | 0 | 0 | 0 | 0 | 0 | 0 | 48.0 | 0 |
| | | Graphite | 0 | 77.0 | 0 | 0 | 0 | 0 | 0 | 0 | 0 | 0 | 76.0 |
| | | Mullite | 0 | 0 | 77.0 | 79.0 | 85.0 | 75.0 | 77.0 | 77.0 | 77.0 | 0 | 0 |
| | Inorganic Fiber | Carbon Fiber | 8.0 | 8.0 | 8.0 | 16.0 | 2.0 | 5.0 | 8.0 | 8.0 | 8.0 | 8.0 | 4.0 |
| | Layered Clay Mineral | Montmorillonite | 30.0 | 15.0 | 15.0 | 5.0 | 13.0 | 20.0 | 14.5 | 13.0 | 10.0 | 0 | 0 |
| | Organic Material | Phenol Resin | 0 | 0 | 0 | 0 | 0 | 0 | 0.5 | 2.0 | 5.0 | 18.0 | 12.0 |
| | | Pulp | 0 | 0 | 0 | 0 | 0 | 0 | 0 | 0 | 0 | 26.0 | 4.0 |
| | | Thermoexpandable Particle | 0 | 0 | 0 | 0 | 0 | 0 | 0 | 0 | 0 | 0 | 4.0 |
| Evaluation | | Mass Loss (%) | 4.8 | 2.1 | 2.1 | 0.4 | 1.4 | 2.2 | 2.7 | 2.8 | 3.2 | 29.7 | 8.9 |
| | | Surface Roughness (Ra) (μm) | 7.3 | 5.4 | 4.1 | 8.2 | 7.1 | 5.0 | 8.8 | 5.0 | 3.4 | 10.2 | 25.0 |

As shown in FIG. 1 and Table 1, the structures of Examples that contain no or not more than 5 mass % of an organic material have a mass loss of 5 mass % or less when heated at 1000° C. In contrast, the structures of Comparative Examples having an organic content of more than 5 mass % have a mass loss exceeding 5 mass %, indicating remarkable gas generation. The structures of Examples containing the layered clay mineral thus prove capable of reducing gas defects in castings.

Compared with Comparative Examples, the castings of Examples exhibit small surface roughness (Ra), proving that the structures of Examples containing the layered clay mineral have excellent surface smoothness as a casting mold.

INDUSTRIAL APPLICABILITY

The present invention provides a structure for manufacturing castings that is light, obtainable. e.g., as a casting mold with good formability, and excellent in high-temperature strength and shape retention during casting.

The present invention also provides a method for making such a structure that is capable of producing castings with excellent surface smoothness and reduced occurrence of gas defects.

The invention claimed is:

1. A mold portion for manufacturing castings, comprising:
a plurality of inorganic fibers,
a layered clay mineral, and
a plurality of inorganic particles other than the layered clay mineral,
wherein the layered clay mineral is interposed between the plurality of inorganic particles and the plurality of inorganic fibers,
wherein the mold portion has a mass loss of 5 mass % or lower when heated at 1000° C. for 30 minutes in a nitrogen atmosphere,
wherein an average particle size of the layered clay mineral interposed between the plurality of inorganic particles and the plurality of inorganic fibers is 0.1 to 500 µm, and
wherein the layered clay mineral is present in an amount of 1 to 50 mass %.

2. The mold portion according to claim 1, wherein the plurality of inorganic particles comprise particles of one or more selected from the group consisting of obsidian, graphite, and mullite.

3. The mold portion according to claim 1, wherein the plurality of inorganic fibers have an average length of 0.5 to 15 mm.

4. The mold portion according to claim 1, wherein the layered clay mineral comprises one or more selected from bentonite or montmorillonite.

5. The mold portion according to claim 1, further comprising an organic component as at least part of the organic content, the organic content of the organic component relative to the total mass of the mold portion for manufacturing castings is not more than 5 mass %.

6. The mold portion according to claim 5, wherein the organic component comprises one or more selected from pulp, starch, a thermosetting resin, a coloring agent, a thermoexpandable particle, a binder, or a shape retaining agent.

7. The mold portion according to claim 1, wherein the plurality of inorganic particles are present in an amount of 40 to 90 mass %.

8. The mold portion according to claim 1, wherein the plurality of inorganic particles have an average particle size of 1 to 3000 µm.

9. The mold portion according to claim 1, wherein each inorganic fiber has an average length of 1 to 8 mm.

10. The mold portion according to claim 1, wherein the plurality of inorganic fibers is present in an amount of 1 to 50 mass %.

11. The mold portion according to claim 1, wherein the plurality of inorganic fiber comprises carbon fibers, and the carbon fibers are present in an amount of 1 to 20 mass %.

12. The mold portion according to claim 1, wherein the layered clay mineral comprises montmorillonite, and the montmorillonite is present in an amount of 1 to 50 mass %.

13. The mold portion according to claim 1, further comprising a coating on a surface of the mold portion, different from the plurality of inorganic fibers, the layered clay mineral, and the plurality of inorganic particles other than the layered clay mineral, and containing refractory particles as a main material and a thermosetting resin or a silicon as an organic component.

14. The mold portion according to claim 1,
wherein the plurality of inorganic particles comprise particles of graphite,
wherein the plurality of inorganic particles have an average particle size of 1 to 3000 µm, and
wherein the plurality of inorganic particles are present in an amount of 40 to 90 mass %.

15. A method for producing a casting comprising casting a molten metal in a mold comprising the mold portion according to claim 1.

16. A structure for manufacturing castings, comprising:
an inorganic fiber,
a layered clay mineral, and
an inorganic particle other than the layered clay mineral,
wherein the layered clay mineral is interposed between the inorganic particle and the inorganic fiber,
wherein the structure has a mass loss of 5 mass % or lower when heated at 1000° C. for 30 minutes in a nitrogen atmosphere, and
wherein the layered clay mineral is present in an amount of 1 to 50 mass % and/or an average particle size of the layered clay mineral interposed between the inorganic particle and the inorganic fiber is 0.1 to 500 µm.

17. The structure according to claim 16, further comprising a coating, different from the inorganic fiber, the layered clay mineral, and the inorganic particle other than the layered clay mineral, and containing refractory particles as a main material and a thermosetting resin or a silicon as an organic component,
wherein the layered clay mineral is present in the amount of 1 to 50 mass % and the average particle size of the layered clay mineral interposed between the inorganic particle and the inorganic fiber is 0.1 to 500 µm.

18. The structure according to claim 17,
wherein the inorganic particle comprises graphite,
wherein the inorganic particle has a particle size of 1 to 3000 µm, and
wherein the inorganic particle is present in an amount of 40 to 90 mass %.

19. The structure according to claim 16, wherein the mold portion has an organic content of 5 mass % or lower of a total mass of the structure.

* * * * *